(12) United States Patent
Bonforte

(10) Patent No.: US 8,572,191 B2
(45) Date of Patent: Oct. 29, 2013

(54) SYSTEMS AND METHODS FOR PROFILE BUILDING

(75) Inventor: Jeff Bonforte, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 377 days.

(21) Appl. No.: 12/767,764

(22) Filed: Apr. 26, 2010

(65) Prior Publication Data

US 2011/0029620 A1 Feb. 3, 2011

Related U.S. Application Data

(60) Provisional application No. 61/230,957, filed on Aug. 3, 2009.

(51) Int. Cl.
*G06F 15/16* (2006.01)
(52) U.S. Cl.
USPC .......................... 709/206; 709/204; 707/758
(58) Field of Classification Search
USPC .......... 709/206, 204; 707/101, 103, 758, 687, 707/609, 661, 726
See application file for complete search history.

(56) References Cited

U.S. PATENT DOCUMENTS

| 6,529,728 B1 * | 3/2003 | Pfeffer et al. ................. 455/418 |
|---|---|---|
| 6,952,805 B1 | 10/2005 | Tafoya et al. |
| 7,228,335 B2 * | 6/2007 | Caughey ....................... 709/206 |
| 7,512,788 B2 | 3/2009 | Choi et al. |
| 7,536,384 B2 | 5/2009 | Venkataraman et al. |
| 7,539,676 B2 | 5/2009 | Aravamudan |
| 7,636,742 B1 * | 12/2009 | Olavarrieta et al. ................... 1/1 |
| 7,725,492 B2 | 5/2010 | Sittig |
| 7,743,051 B1 | 6/2010 | Kashyap et al. |
| 7,788,260 B2 | 8/2010 | Lunt |
| 7,805,492 B1 * | 9/2010 | Thatcher et al. .............. 709/206 |
| 7,827,208 B2 | 11/2010 | Bosworth |
| 7,899,806 B2 | 3/2011 | Aravamudan |
| 7,949,627 B2 | 5/2011 | Aravamudan |
| 2002/0087647 A1 | 7/2002 | Quine et al. |
| 2002/0103873 A1 | 8/2002 | Ramanathan et al. |
| 2002/0103879 A1 | 8/2002 | Mondragon |
| 2003/0028525 A1 | 2/2003 | Santos et al. |
| 2004/0034537 A1 | 2/2004 | Gengarella et al. |
| 2005/0166160 A1 * | 7/2005 | Bergstrom et al. ........... 715/780 |
| 2006/0004892 A1 | 1/2006 | Lunt |
| 2007/0022447 A1 | 1/2007 | Arseneau et al. |
| 2007/0123222 A1 | 5/2007 | Cox et al. |
| 2007/0214141 A1 | 9/2007 | Sittig |
| 2007/0288578 A1 | 12/2007 | Pantalone |
| 2008/0040370 A1 | 2/2008 | Bosworth |
| 2008/0040474 A1 | 2/2008 | Zuckerberg |
| 2008/0040475 A1 | 2/2008 | Bosworth |
| 2008/0162347 A1 | 7/2008 | Wagner |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 * | 1/2009 | Brezina et al. ............ 707/103 Y |

(Continued)

*Primary Examiner* — Krisna Lim
(74) *Attorney, Agent, or Firm* — Greenberg Traurig, LLP

(57) ABSTRACT

Systems and methods build a profile for a contact. In one aspect, missing information from a profile of a contact is identified. A determination is made regarding whether the missing information is necessary for the profile based on satisfaction of a threshold. In response to the satisfaction of the threshold, a user is prompted to request the missing information from the contact. The missing information is obtained. The missing information is added to the profile.

20 Claims, 9 Drawing Sheets

(56) References Cited

U.S. PATENT DOCUMENTS

| | | |
|---|---|---|
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0070412 A1 | 3/2009 | D'Angelo |
| 2009/0106415 A1 | 4/2009 | Brezina et al. |
| 2009/0106676 A1 | 4/2009 | Brezina et al. |
| 2009/0119678 A1 | 5/2009 | Shih et al. |
| 2009/0132395 A1* | 5/2009 | Lam et al. ........................ 705/30 |
| 2009/0157717 A1* | 6/2009 | Palahnuk et al. ............. 707/101 |
| 2009/0177754 A1 | 7/2009 | Brezina et al. |
| 2009/0182788 A1 | 7/2009 | Chung et al. |
| 2009/0198688 A1 | 8/2009 | Venkataraman et al. |
| 2010/0030715 A1 | 2/2010 | Eustice et al. |
| 2010/0049534 A1 | 2/2010 | Whitnah |
| 2010/0164957 A1 | 7/2010 | Lindsay |
| 2010/0169327 A1 | 7/2010 | Lindsay |
| 2010/0185610 A1 | 7/2010 | Lunt |
| 2010/0229223 A1 | 9/2010 | Shepard |
| 2010/0248681 A1* | 9/2010 | Phills ........................ 455/404.2 |
| 2010/0306185 A1 | 12/2010 | Smith |

* cited by examiner

SYSTEMS AND METHODS FOR PROFILE BUILDING

FIELD OF THE TECHNOLOGY

At least some embodiments of the disclosure relate to profile information and, more particularly but not limited to, systems and methods for adding and updating missing profile information.

BACKGROUND

Many systems and applications have been developed to allow people to communicate with each other. Such systems and applications may communicate via emails, instant messages, text messages, web/online postings, etc. Some user terminals (e.g., personal computers, PDA, and mobile phones) may support communications in multiple modes, such as email, instant messages, and text messages.

Conventional applications have been developed to organize address information for users. For example, an address application may store information about a plurality of persons. For each of the persons, the address application may store the name of the person, the email address of the person, the street address of the person, the IM address of the person, the web page address of the person, phone numbers of the person, etc.

Despite these capabilities of conventional address applications, the initial capture of the address information is often dependent on users of the applications to proactively acquire the address information from communications with others. Only then can the captured information be stored and organized by the conventional address applications. The completeness of address information stored and organized in conventional address applications thus relies heavily on the diligence exercised by the users.

Users often do not capture different types of address information regarding their contacts for a variety of reasons. For example, users may wish to avoid the expenditure of extra time and effort to obtain various address information from their contacts. As another example, users may believe that the limited address information that they have already obtained from their contacts is sufficient for their current communication purposes. As yet another example, users may not realize that certain address information for their contacts is missing and thus do not proceed to acquire it. The lack of address information can be detrimental to establishing and enabling complete and effective communications between users and their contacts.

SUMMARY OF THE DESCRIPTION

Systems and methods are provided to build a profile. Some embodiments are summarized in this section.

In one embodiment, missing information from a profile of a contact is identified. A determination is made regarding whether the missing information is necessary for the profile based on satisfaction of a threshold. In response to the satisfaction of the threshold, a user is prompted to request the missing information from the contact. The missing information is obtained. The missing information is added to the profile.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a user terminal is configured to build a profile for a contact of a user. Missing information in the profile of the contact is identified and determined to be needed by the user. Various sources are searched to obtain the missing information. In addition or alternatively, the user is prompted to request the missing information directly from the contact. Once the missing information is obtained, it is added to the profile of the contact.

Figure 1:
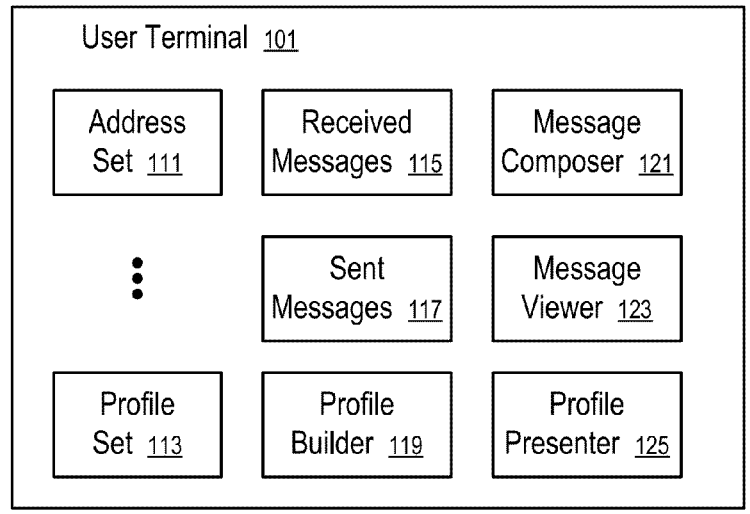
FIG. 1 shows a user terminal to build a profile according to one embodiment.

FIG. 1 shows a user terminal (101) to provide assistance in address input according to one embodiment. The user terminal (101) may be implemented as a personal computer, a web enabled television set, a personal digital assistant (PDA), or a mobile phone, using special purpose hardware (Application-Specific Integrated Circuit (ASIC) or Field-Programmable Gate Array (FPGA)), software and a general purpose processor, or a combination of special purpose hardware and software. Thus, the disclosure is not limited to a particular implementation.

In FIG. 1, the user terminal (101) is configured to store messages (115) received at the user terminal (101) and messages (117) sent from the user terminal (101). The user terminal (101) includes a message viewer (123) which can be used to display a message selected from the received messages (115) or selected from the sent messages (117).

In FIG. 1, the user terminal (101) further includes a message composer (121) which is configured to present a user interface to facilitate the composition of an outgoing message.

In one embodiment, the user terminal (101) is configured to generate an address set (111) based on the addresses that have been specified in the message composer (121) for one or more previously sent messages (117). When an address is used in the message composer (121) to specify a recipient of a message, the address is added to the address set (111), if the address is not already in the address set (111).

In one embodiment, the message composer (121) uses the address set (111) to suggest candidates for the completion of an input when the user is typing an address.

In one embodiment, the user terminal (101) further includes a profile presenter (125), which can provide suggestions for completion based on a profile set (113) maintained by a profile builder (119).

In one embodiment, the profile builder (119) is configured to extract profile data of various persons based on the received messages (115) and the sent messages (117). The profile builder (119) can extract information about persons not only from the headers of the messages where the senders and the recipients of the messages are specified, but also from the bodies of the messages and from other online sources, such as online directory, social networking websites, web pages, result pages found by search engines, etc.

In one embodiment, since the profile builder (119) obtains the profile data for various persons referenced in the messages (115 and 117), the profile set (113) can be more comprehensive than the address set (111).

In one embodiment, the profile builder (119) is configured to scan the received messages (115) and the sent messages (117) for email addresses and names associated with the email addresses. The profile builder (119) generates a profile for each person identified to create the profile set (113). When new messages are received or sent, the profile set (113) is updated based on the new messages.

In some embodiments, the profile builder (119) may further identify persons based on scanning the received messages (115) and the sent messages (117) for phone numbers, names, addresses, etc.

In some embodiments, some or all of the components (111-125) in the user terminal (101) may be hosted on a server remote to the user terminal (101) (e.g., accessible via a website and a web browser). For example, in one embodiment, the received messages (115) and the sent messages (117) may be hosted on a web site; and the user can use a web browser to view a selected one of the messages (115 and 117).

For example, the profile builder (119) may be configured to communicate with the server to extract the profile set (113) from the messages (115 and 117) hosted on the server. Alternatively, the profiler builder (119) may also be hosted on the server to build the profile set (113) on the server.

Figure 2:
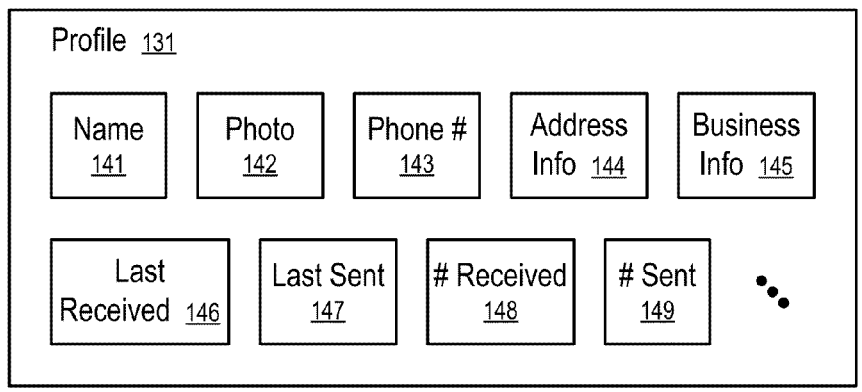
FIG. 2 illustrates a profile according to one embodiment.

FIG. 2 illustrates a profile of a person according to one embodiment. In FIG. 2, the profile (131) includes various fields, such as the name (141) of a person, a photo image (142) of the person, one or more phone numbers of the person (143), address information (144) (e.g., email address, IM address, street address), business information (145) (e.g., employer, work address, job title), the date and time of the last message received from the person (146), the date and time of the last message sent to the person (147), the total number of messages received from the person (148), the total number of messages sent to the person (149), etc.

In one embodiment, the profile builder (119) obtains at least some of the information for the fields from the received messages (115) or the sent messages (117) to identify the person and then use other information sources to obtain the data for the other fields in an automated way to collect the profile information on behalf of the user.

For example, the profile builder (119) may use social networks, search engines, photo services, etc. to obtain the photo (142), the business information (145), etc.

Figure 3:
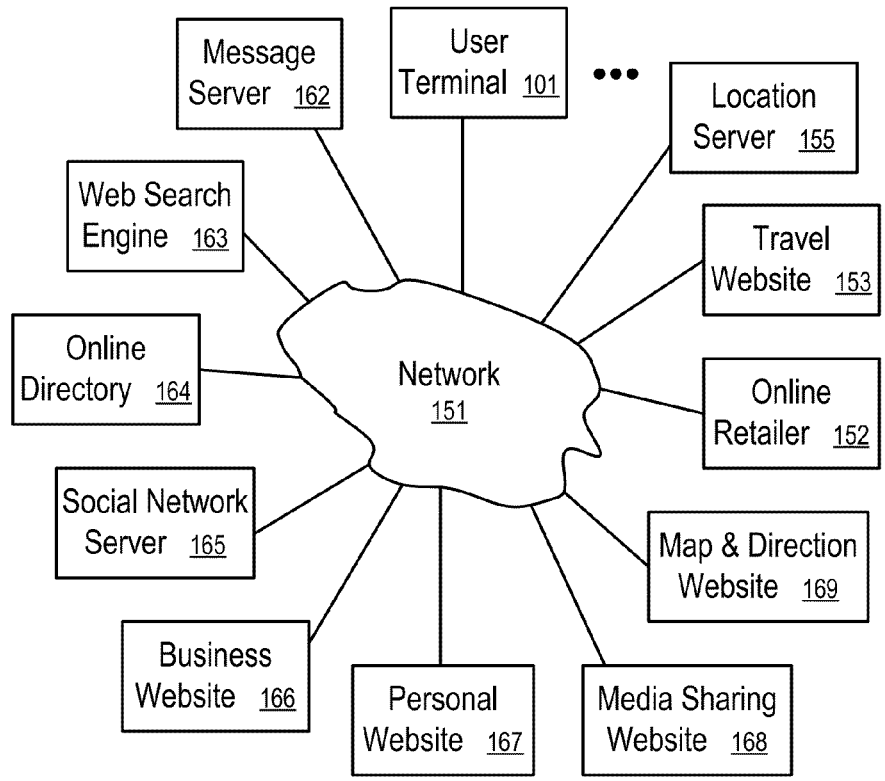
FIG. 3 illustrates a system to obtain data for a profile according to one embodiment.

FIG. 3 illustrates a system to obtain data for a profile according to one embodiment. In FIG. 3, under the control of the profile builder (119) the user terminal (101) may communicate with various servers in an automated way to extract data for the profile (131) over a network (151). The network (151) may include a local area network, a cellular telecommunications network, wireless wide area network, a wireless local area network, a wireless personal area network, an intranet, and/or Internet.

In one embodiment, the user terminal (101) communicates with the message server (162) to receive and send the messages (115 and 117).

In one embodiment, after the profile builder (119) extracts from the messages (115 or 117) certain information (e.g., an email address, an IM user name, a phone number, and/or a name) about a person, the profile builder (119) uses the extracted information to query various servers to obtain further information (e.g., photo (142), phone number (143), address information (144), and/or business information (145)) about the person to create the profile (131).

For example, the user terminal (101) may query a web search engine (163), an online directory (164), a social network server (165), a business website (166), a personal website (167), a media sharing website (168), a map and direction web site (169), an online retailer (152), a travel website (153), a location server or website (155), and/or other servers. Information that can be used as search criteria include names, screen names, social network profile names, social network profile URLs, physical addresses, website URLs, email addresses, or telephone numbers. Information that is collected as a result of these queries may be used in future searches to identify additional information that may be used to create a profile of a person.

For example, the user terminal (101) may receive an email sent by a person via the message server (162). The profile builder (119) of the user terminal (101) is configured to perform a search using the web search engine (163) with the email address of the person as the search criteria. The search engine (163) may return a search result that includes the phone number (143) of the person. The profile builder (119) extracts the phone number (143) from the search result and stores the phone number (143) as part of the profile (131) for the person. The search engine (163) may also return the URL for or link to a personal website (167) belonging to the person. The personal website (167) may contain additional information about the person that may be used to create a person profile, such as additional contact information or biographical information.

In another example, the email address belonging to the person may include an extension (or domain name) for a company. The profile builder (119) of the user terminal (101)

is configured to perform a search using the search engine (163) with the email extension (or domain name) as the search criteria. A result returned by the search may be a business website (166). The profile builder (119) of the user terminal (101) is further configured to search the business website (166) obtain information relevant to the profile (131) for the person. For example, a web page on the business website (166) may contain additional information about the person that may be used to create a profile, such as business information (145), additional contact information, or biographical information.

In another example, the profile builder (119) of the user terminal (101) is configured to perform a search using the online directory (164) (e.g., a person search directory, a yellow page directory) with the name (141) of the person or other contact information as the search criteria. The online directory (164) may return search results with additional contact information and other information that may be used for the profile (131) of the person.

In another example, the user terminal (101) may receive an email sent by the person via the message server (162). The email may contain a social network user name for the person. The profile builder (119) of the user terminal (101) is configured to extract this social network user name from the email and use it to access the social network server (165). A webpage on the social network server (165) may contain additional contact information and other information that may be extracted and used by the profile builder (119) to create the profile (131) for the person. The webpage on the social network server (165) may also contain additional contacts that may be associated with the person in the profile (131). For example, persons on the friends list of the webpage on the social network server (165), or persons who have posted comments or messages on the social network server (165) may be listed as contacts in a contact network for the person.

In another example, a search performed using the search engine (163) may return a URL or link for media sharing website (168) (e.g., for sharing photos or videos). The media sharing website (168) may store profile information about the person. Thus, the profile builder (119) of the user terminal (101) can extract additional contact information or biographical information from the media sharing website (168) for the creation of the profile (131) for the person. For example, a profile belonging to the person on a video sharing website may include an instant message screen name (user name) for the person. This screen name may be extracted and displayed as part of the profile (131) of the person.

In one embodiment, information extracted from communications between the person and other users may also be used to update profile information on the social network server (165) or other websites. For example, the profile builder (119) of the user terminal (101) may detect that the person has primarily used email address "david@foo.com" in recent communications, while the profile of the person on the social network server (165) shows his email address as "david@bar.com." The profile builder (119) of the user terminal (101) can share the new email address of the person with the social network server (165) to allow the social network server (165) to automatically update the corresponding information about the person, or to suggest the person to make an update based on this changed behavior detected by the profile builder (119) of the user terminal (101).

In one embodiment, the profile builder (119) of the user terminal (101) can also extract information about the person from the travel website (153) and the online retailer (152) for the creation of the profile (131) of the person. For example, after an email containing information about a flight itinerary is received in the user terminal (101), the profile builder (119) of the user terminal (101) may extract a flight number or other information about a flight from the email. The profile builder (119) of user terminal (101) then queries the travel website (153) using the flight number or other flight information as search criteria. Information about the flight, such as, the destination city or the departure city, expected departure time, expected arrival time, expected delays, weather in the destination city, weather in the departure city, or any changes to the flight may be used as part of the profile (131) of the person.

In another example, an email containing information about an item or service that the second user is interested in purchasing may be received in the user terminal (101). The profile builder (119) of user terminal (101) is configured to query one or more search engines, websites, or on-line retailers (152) to determine which retailer or website has the best price or currently has the item in stock or the service available. This information is extracted by the profile builder (119) and displayed by the profile presenter (125) as part of the profile (131) of the person.

In one embodiment, the profile builder (119) of the user terminal (101) can also extract information from map and direction website (169) and location servers (155) as part of the profile (131) of the person. For example, the person may own a GPS unit, cell phone, or other device that is capable of transmitting the person's current physical location to the location server (155), which allows other users to access the person's current location information. If the user of the user terminal (101) has permission to view the location information of the person, the profile builder (119) of the user terminal (101) may access the location server (155) over the network (151) to receive location information about the person. This location information can be displayed as part of a profile.

The profile builder (119) of the user terminal (101) may also access the map and direction website (169) to create a map of the current location of the person, or to generate directions to the current location of the person. The map or directions may be displayed by the profile presenter (125) as part of the profile (131) for the person. The map and direction website (169) may also be used to generate a map or directions to one or more known street addresses of the person, such as a work address or home address. The map or directions can be displayed by the profile presenter (125) as part of the profile (131) of the person.

Figure 4:
FIG. 4 illustrates an exemplary profile of an exemplary contact according to one embodiment.

FIG. 4 illustrates a exemplary profile (400) in a simplified listing of various information fields (402) for a contact. The exemplary contact is for a person "Tabitha Sarni". It will be appreciated that exemplary discussion of Tabitah Sarni herein is employed for purposes of illustration only. The illustrative discussion is merely one of countless applications of the present invention and its many embodiments, and is not to limit the scope of the present invention and its many embodiments.

In one embodiment, the profile (400) can be for a person. In one embodiment, the profile (400) can be for an organization, a group, or other entity.

The information fields (402) listed in the profile (400) relate to a contact, and include a photo, name, title, company, position, office phone, mobile phone, email address (personal), and email address (work). In one embodiment, other types of information can be additionally included in the exemplary profile (400). For example, the profile (400) can include contact information concerning residential street address, work street address, marital status, age, birthday, family, username for a website or network, etc. The profile (400) can also include information that may transcend conventional notions of profile information such as school affiliation, group membership, political affiliations, languages spoken, interests, hobbies, location, etc. In one embodiment, certain types of information can be omitted from the profile (400). The profile (400) contains information corresponding to each of the information fields (402) except for the title field (404) and the mobile phone field (406). The title field (404) relates to information regarding the status of the contact and how to address the contact as, for example, "Mr.", "Ms.", "Mrs.", "Dr.", etc. The mobile phone field (406) relates to information regarding the telephone number of the mobile phone of the contact. In this example, the title information and the mobile phone information is missing information.

Figure 5:
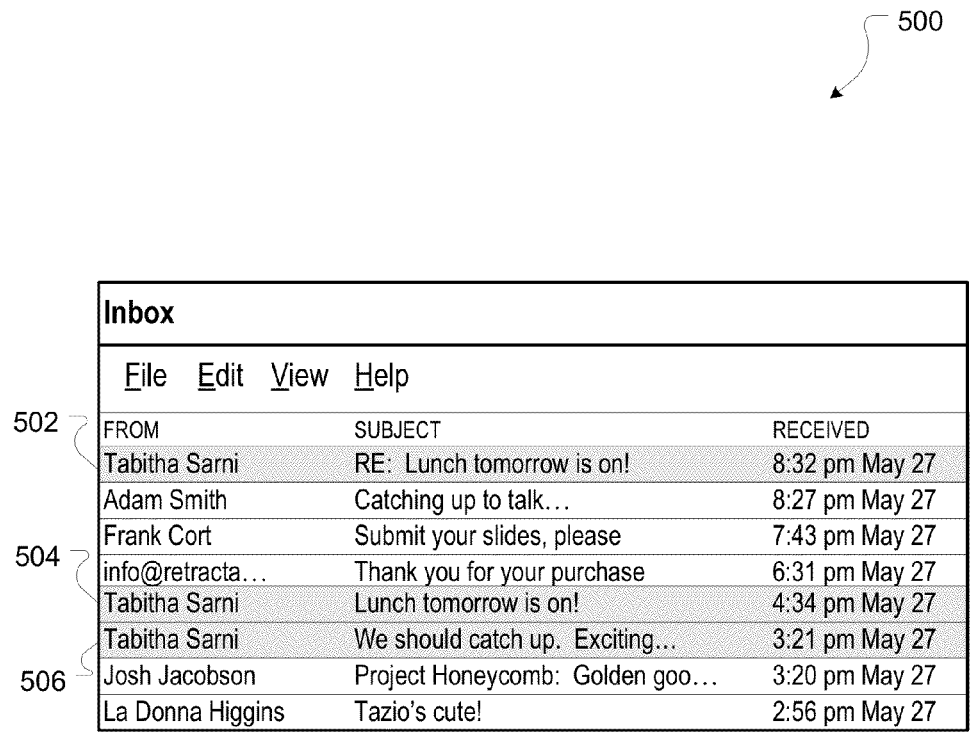
FIG. 5 illustrates an exemplary inbox from which to determine the satisfaction of a threshold according to one embodiment.

FIG. 5 is a simplified view of an inbox (500) of email messages (115) received by a user. In one embodiment, the inbox (500) can contain messages of any communication medium type or format other than email. In one embodiment, the inbox (500) can store instant messages. In one embodiment, the inbox (500) can store text messages. In one embodiment, the inbox (500) can store messages of different communication medium types or formats, such as email, text message, instant message, phone calls, etc.

The inbox (500) includes a listing of received email from various sources and contacts. In one embodiment, the inbox (500) displays for each message the sender or source of the message, the subject of the message, and the date and time of message. The inbox (500) can also organize the received messages by, for example, chronology. In the illustration, the inbox (500) includes various messages from Tabitha Sarni. A message (502) was received from Tabitha Sarni at 8:32 pm on May 27 and includes a description "Lunch tomorrow is on!" in the "RE:" field of the message (502). A message (504) was received by the inbox (500) from Tabitha Sarni at 3:21 pm on May 27 and includes a description "Lunch tomorrow is on!" in the "RE:" field of the message (504). A message (506) was received by the inbox (500) from Tabitha Sarni at 3:20 pm on May 27 and includes a description "We should catch up. Exciting . . . " in the "RE:" field of the message (506). The message (502) is the most recent message received by the inbox (500) and is a response to a message in a thread initiated by the message (504).

In one embodiment, the profile builder (119) analyzes the profiles for the various contacts associated with the messages in the inbox (500) to identify information fields in the profiles of the contacts that contain missing information. With respect to Tabitha Sarni, the profile for Tabitha Sarni is analyzed to determine whether any information fields in the profile contain missing information. It is determined that the title field (404) and the mobile phone field (406) in the profile for Tabitha Sarni contain missing information.

In one embodiment, after identifying missing information, the profile builder (119) determines whether the missing information is needed for the profile. In one embodiment, not all missing information is needed for the profile. Some, none, or all missing information may be needed, as described in more detail below. For example, missing information for the information field work street address would not be needed for a contact who is temporarily not employed.

The determination of whether missing information is needed can depend on the satisfaction of a threshold. In one embodiment, the threshold can relate to communication velocity (frequency) or volume. In one embodiment, the threshold can relate to communication context or content. In one embodiment, the threshold can be a default value set by the user terminal (101). In one embodiment, the threshold can be set by the user. In one embodiment, the threshold reflects an optimal time during which the profile builder (119) should automatically seek to obtain missing information.

With respect to a threshold relating to communication velocity or volume, the profile builder (119) receives a threshold value. In one embodiment, the threshold value can be a value of a number of messages received from a particular contact in a predetermined time duration. In one embodiment, the threshold value can be a value of a total number of messages received from a particular contact.

In one embodiment, when a threshold value relates to communication frequency, the profile builder (119) analyzes the inbox (500) to determine the actual frequency of communications from a particular contact in a predetermined period of time. The actual frequency is compared with the threshold value. If the actual frequency is equal to or greater than the threshold value, then a determination is made that the missing information is necessary. In one embodiment, the profile builder (119) can search the inbox (500) of email messages, text messages, instant messages, etc., or any combination thereof, to determine whether the threshold is satisfied.

In one embodiment, the user terminal (101) is coupled to or includes a utility or module for voice communication (e.g., VoIP) as another communication medium type. The threshold can relate to the frequency and number of phone calls made between the user and the contact.

When a threshold value relates to communication volume, the profile builder (119) analyzes the inbox (500) to determine the total number of messages from a particular contact. The total volume is compared with the threshold value. If the total volume is equal to or greater than the threshold value, then a determination is made that the missing information is necessary.

In one embodiment, the threshold can relate to any combination of communication frequency and communication volume. For example, the threshold may be satisfied at the earlier of when the actual frequency is equal to or greater than a threshold value relating to communication frequency and when the actual communication volume is equal to or greater than a threshold value relating to communication volume. As another example, the threshold may be satisfied when both the actual frequency is equal to or greater than a threshold value relating to communication frequency and the actual communication volume is equal to or greater than a threshold value relating to communication volume.

For purposes of illustration, assume the threshold value relates to communication frequency in the example of Tabitha Sarni. In particular, assume the threshold value is three messages per 12 hours or 0.25 messages/hour. The profile builder (119) analyzes the inbox (500) and determines that the inbox (500) received three messages from Tabitha Sarni in the period between 3:21 pm and 8:32 pm on May 27. Thus, profile builder (119) calculates the actual frequency of messages from Tabitha Sarni to be 0.58 messages/hour. The profile builder (119) compares the actual frequency of 0.58 messages/hour to the threshold value of 0.25 messages/hour. The actual frequency is greater than the threshold value. Accordingly, the profile builder (119) determines that the missing information in the profile for Tabitha Sarni is needed.

For purposes of illustration, assume the threshold value relates to communication volume in the example of Tabitha Sarni. In particular, assume the threshold value is two messages from Tabitha Sarni. The profile builder (119) analyzes the inbox (500) and determines that the inbox (500) received three messages from Tabitha Sarni in the period between 3:21 pm and 8:32 pm on May 27. The profile builder (119) compares the total messages value of three messages to the threshold value of two messages. The actual frequency is greater than the threshold value. Accordingly, the profile builder (119) determines that the missing information in the profile for Tabitha Sarni is needed.

With respect to threshold relating to communication context or content, the profile builder (119) receives a threshold event. In one embodiment, the threshold event can relate to, for example, occurrence of an event, scheduling of an event, appearance of terms, words, or other content in communications between the user and a contact, etc. In one embodiment, other context and content related considerations can be used to define a threshold event.

The profile builder (119) analyzes the inbox (500) and, as needed, other information sources to determine whether the threshold event has occurred. In one embodiment, the other information sources can include, for example, a calendar of the user that organizes and schedules the activities of the user. In one embodiment, user terminal (101) includes the calendar (not shown). In one embodiment, the calendar is implemented as an application apart from the user terminal (101). In one embodiment, the other information sources can include the various servers and websites discussed in connection with FIG. 3. If the event has occurred, then the profile builder (119) determines that the threshold event is satisfied. Accordingly, it is determined that the missing information is necessary.

For example, assume the threshold event is set to relate to the occurrence of an event involving Tabitha Sarni and, in particular, a proposal that Tabitha Sarni and the user meet. Upon analyzing the inbox (500), and the content of the messages therein, or the other information sources including the calendar for the user, the profile builder (119) determines that, during their communications, the user and Tabitha Sarni have proposed a meeting. It is thus determined that the threshold event is satisfied. Accordingly, the profile builder (119) determines that the missing information in the profile for Tabitha Sarni is necessary to obtain.

As another example, assume the threshold event is set to relate to the scheduling of a meeting between the user and Tabitha Sarni. Upon analyzing the inbox (500), and the content of the messages therein, or the calendar for the user, the profile builder (119) determines that the user has scheduled a meeting with Tabitha Sarni. It is determined that the threshold event is satisfied. Accordingly, the profile builder (119) determines that the missing information in the profile for Tabitha Sarni is necessary to obtain.

As yet another example, assume the threshold event is set to relate to the appearance of terms and other content in communications between the user and Tabitha Sarni and, in particular, to the use of words that reference or describe a meeting between the two. In one embodiment, the threshold event is identified by the appearance of keywords in the communications between the user and the contact. For example, the term "lunch" may be a keyword triggering the determination of a meeting. Upon analyzing the inbox (500), and the content of the messages therein, or the other information sources including the calendar for the user, the profile builder (119) determines that the communications between the user and Tabitha Sarni include the appearance of terms or words that reference and describe a meeting between them. It is thus determined that the threshold event is satisfied. Accordingly, the profile builder (119) determines that the missing information in the profile for Tabitha Sarni is necessary to obtain.

In one embodiment, the threshold value or event may vary depending on the relationship type between the user and the contact. For example, a relationship type of "friend" may have a higher threshold than a relationship type of "business contact". As another example, a relationship type of "acquaintance" may have a higher threshold than a relationship type of "friend". In one embodiment, the dependence of the threshold values on the relationship type can be set by default by the profile builder (119) or the user terminal (101). In one embodiment, the dependence of the threshold values on the relationship type can be set by the user.

In one embodiment, the threshold value or event can depend on the identity of the contact.

In one embodiment, if multiple information fields contain missing information, the profile builder (119) selectively determines which missing information is needed. In one embodiment, the determination regarding which missing information is needed can depend on the relationship type between the user and the contact, the information type of the missing information, the context and content of communications with the contact, etc. For example, assume that Tabitha Sarni is a close personal friend of the user. Accordingly, based on the relationship type between the user and Tabitha Sarni as "friends", the missing information for the title field (404) is not needed because it is likely that, as a friend of Tabitha Sarni, the user already knows the status of Tabitha Sarni or would not have a need to address Tabitha Sarni in a formal way involving the title of Tabitha Sarni.

In one embodiment, various missing information in a profile is prioritized and the profile builder (119) sequentially obtains the missing information according to the prioritization.

In one embodiment, each information field in the profile is associated with a corresponding unique threshold value and the profile builder (119) determines whether information is necessary based on an information field-by-information field basis.

In one embodiment, the profile builder (119) does not determine whether missing information is needed. Rather, the profile builder (119) assumes that all missing information from the profile is needed and accordingly proceeds to obtain all such missing information.

In one embodiment, the profile builder (119) performs the functions of, for example, identifying missing information, obtaining the missing information, and adding the information to the profile. In one embodiment, a utility other than the profile builder (119) performs these functions. In one embodiment, a combination of utilities, including or excluding the profile builder, performs these functions.

As described above, the profile builder (119) may determine that missing information for the profile of the contact is necessary based on the satisfaction of a threshold value or event. As a result, the profile builder (119) automatically attempts to obtain that information from, for example, the information sources described in connection with FIG. 3. In one embodiment, the profile builder (119) will attempt to acquire the missing information from, for example, social networks, partner networks, and non-partner networks. In one embodiment, the profile builder (119) will attempt to obtain the missing information directly from the contact. In one embodiment, the profile builder (119) will attempt to first obtain the missing information from information sources other than the contact and, if the missing information cannot be obtained, then attempt to obtain the missing information from the contact. In one embodiment, the profile builder (119) will seek to obtain the information from the contact and from the other information sources in parallel.

In one embodiment, the missing information can be obtained through a phone call with the contact. For example, if the user and the contact are communicating via a VoIP communications link, the profile builder (119) can use voice recognition capabilities to detect the verbalization of a phone number of the contact during a conversation with the user. The phone number detected through voice recognition is then captured by the profile builder (119).

Figure 6:
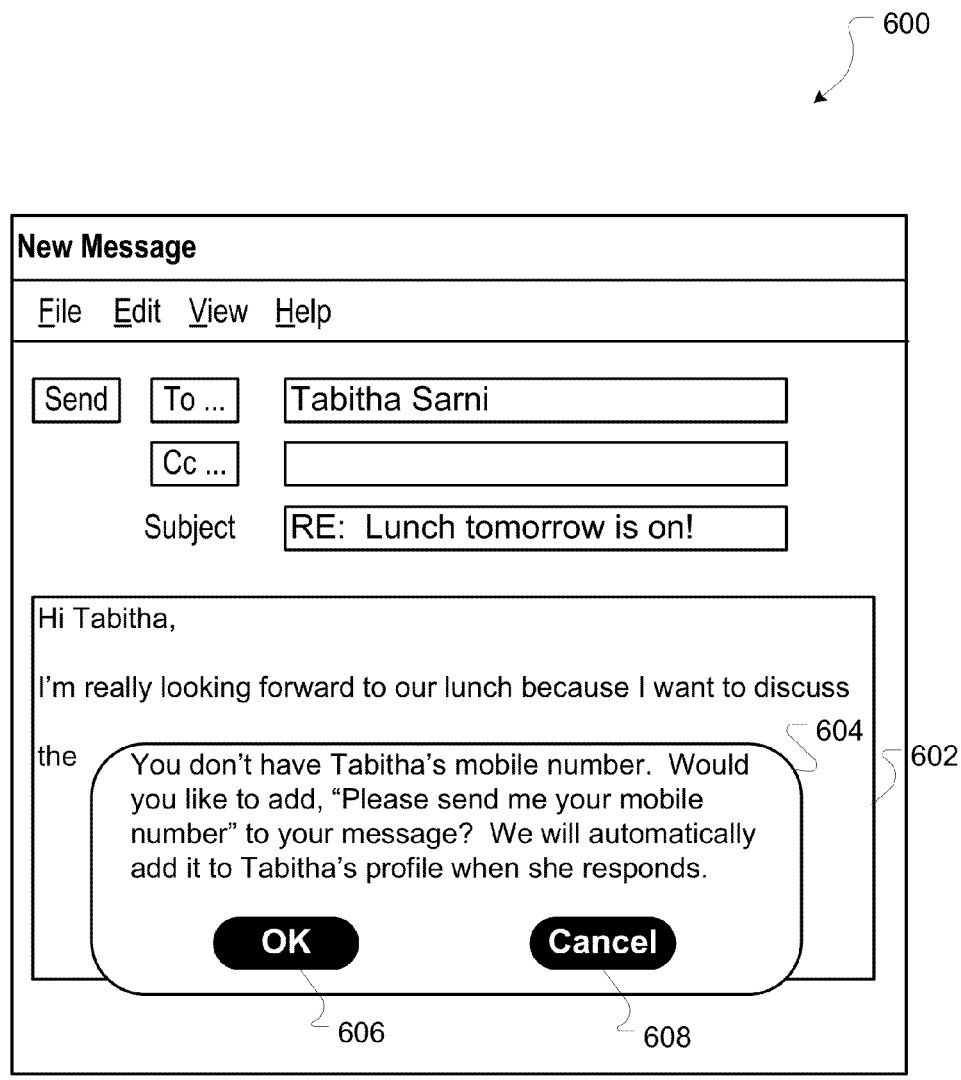
FIG. 6 illustrates an exemplary message to prompt a user to request missing information according to one embodiment.

FIG. 6 illustrates an exemplary email message (600) authored by the user in communication with a particular contact after the profile builder (119) has decided that missing information is necessary to obtain for the profile of the contact. The message (600) includes a pop-up box (604) that overlays a text entry area (602) for the message (600). The pop-up box (604) automatically appears before or during the creation of the message (600) by the user. The pop-up box (604) prompts the user to request the missing information from the contact. In one embodiment, the pop-up box (604) includes a quote of text to be automatically inserted into the message (600) upon the approval of the user. The text is a request for the contact to provide the missing information. The user can approve the inclusion of the text in the message (600) by selecting an "OK" button in the pop-up box (604). The user can reject the inclusion of the text in the message (600) by selecting a "Cancel" button 608.

In one embodiment, the text to request the contact to provide the missing information can be edited by the user.

In one embodiment, the text to request the contact to provide the missing information is provided by the user.

In the example illustrated in FIG. 6, the message (600) is a response to the message (502), and relates to an upcoming lunch meeting between the user and Tabitha Sarni. The profile builder (119) has determined that a threshold value or event has been satisfied, requiring the acquisition of the mobile telephone number of Tabitha Sarni. Accordingly, the profile builder (110) causes the pop-up box (604) to automatically appear during the creation of the message (600). The pop-up box (604) asks the user to include this text in the message (600): "Please send me your mobile number". By clicking the "OK" button (606), the user can assent to the inclusion of the text in the message (600).

In one embodiment, the prompting of the user to request missing information from the contact may appear in a message of any communication medium type (or mode) such as email, text message, instant message, etc. In one embodiment, a message of a communication medium type that includes a request to the contact to provide missing information can be of a communication medium type different from the communication medium type that is searched to determine whether a threshold has been satisfied. For example, if the inbox (500) for email messages is searched to determine that a threshold has been satisfied, the request to provide missing information can be included in a non-email message to the contact, e.g., text message or instant message.

In one embodiment, the present invention can be implemented in an enterprise application, including, for example, a customer relationship management (CRM) application. For example, in a CRM application, the user may have the role of a sales person or customer account personnel of a company, and the contact may have the role of a prospect or a customer.

In one embodiment, a CRM application involves the use of voice recognition capabilities during a call between the user and the contact. The voice recognition capability can detect the voice of the contact during a phone call and identify the contact using a database that can match the voice to a particular customer of a company. With the particular customer identified, the profile builder (119) can analyze the profile of the customer to determine if any information is missing from the profile. Next, whether the missing profile information is necessary for the profile can depend on the satisfaction of a threshold. The threshold may be a communication frequency value or communication volume value. As discussed above, the threshold, for example, can relate to the frequency of contacts between the customer and the company, or to the total volume of communications between the two. As another example, the threshold can relate to an event, such as an imminent purchase of goods or services of the company by the customer. In one embodiment, any number of other thresholds that have significance in a CRM context can be used to set a threshold. If missing information is deemed necessary due to the satisfaction of the threshold, the missing information can be sought, obtained, and added to the profile for the customer, as described above.

In one embodiment, the profile builder (119) can identify, not only missing information from a profile, but also dated information in the profile that should be replaced with updated information. The profile builder (119) can then determine whether the dated information requires updating based on the satisfaction of a threshold, as described above. If the threshold is satisfied, the profile builder (119) can search other information sources as well as prompt the user to request updated information directly from the contact. The updated information is obtained, and ultimately replaces the dated information in the profile. For example, assume that the user has attempted to communicate with the contact using a phone number in the profile of the contact but each time the contact did not answer the phone call at that phone number. The profile builder (119) accordingly determines that the phone number may be dated information, and proceeds to replace the dated information with updated information, as described above.

In one embodiment, before determining that a profile for a contact contains missing information, the profile builder (119) first determines whether a threshold is satisfied with respect to the contact, as discussed above. Once the threshold is satisfied, the profile builder (119) checks to see if the profile of the contact has missing information. If the profile builder (119) determines that the profile has missing information, the profile builder then attempts to obtain the missing information, as discussed above.

In one embodiment, the various functions performed by the profile builder (119) are automatically performed without intervention or input by the user.

In one embodiment, the various functions performed by the profile builder (119) are selectively automatically performed in response to intervention or input by the user.

Figure 7:
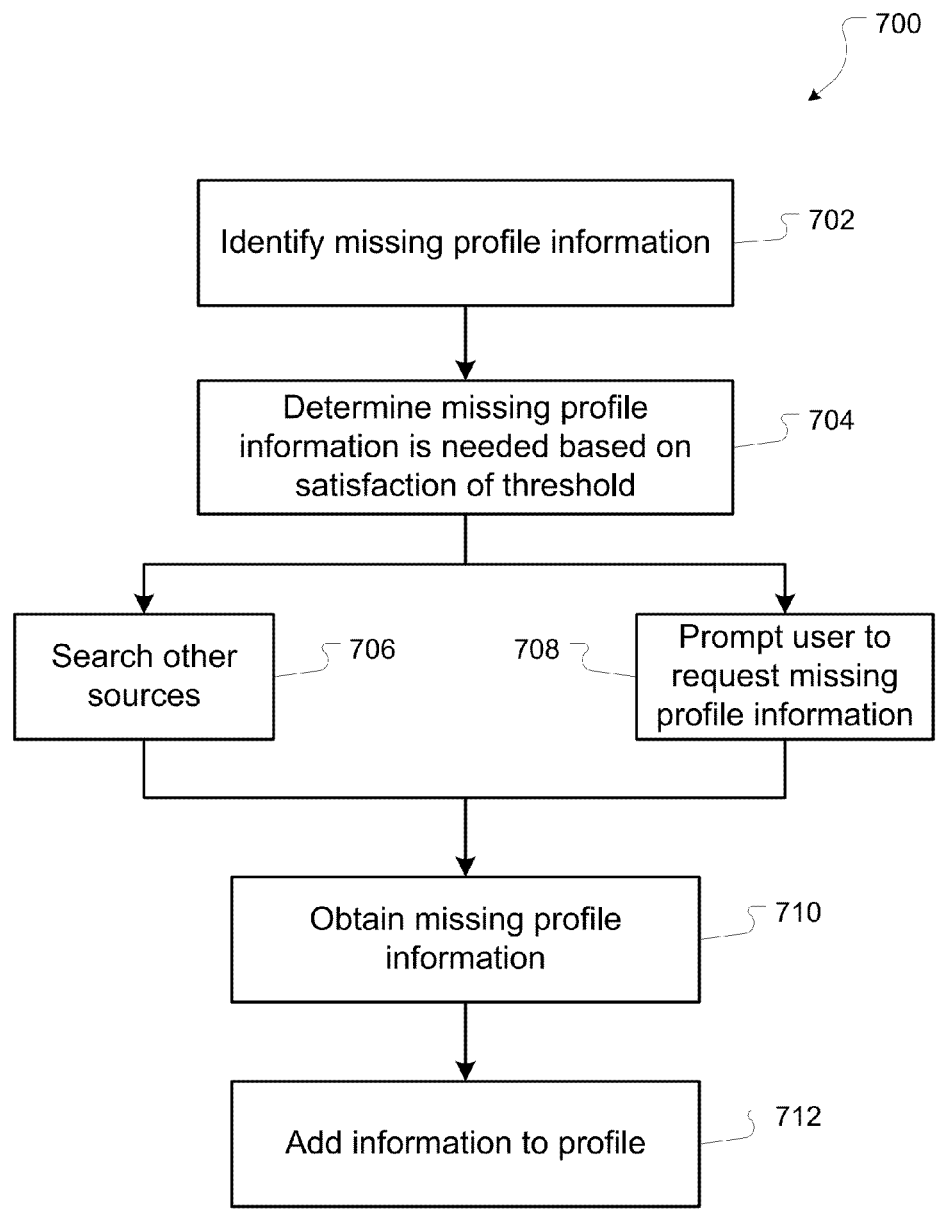
FIG. 7 shows a method to obtain missing information and build a profile according to one embodiment.

FIG. 7 illustrates a method (700) to add information to a profile when missing information relating to the profile is determined to be necessary. The method (700) begins in a step (702), where information fields of a profile are analyzed to identify missing information. The method (700) proceeds to step (704) where it is determined that missing information is needed. The determination is based on satisfaction of a threshold value or event. The method (700) proceeds to steps (706, 708). In step (706), various networks and databases, such as social networks, partner networks, and non-partner networks, are searched for the missing information. At the same time, or in selective sequence, in step (708), the contact is directly prompted to provide the missing information. The method (700) proceeds to step (710) where the missing information that was needed is obtained. The method (700) proceeds to step (712), where the missing information is added to the profile and the method (700) ends.

Figure 8:
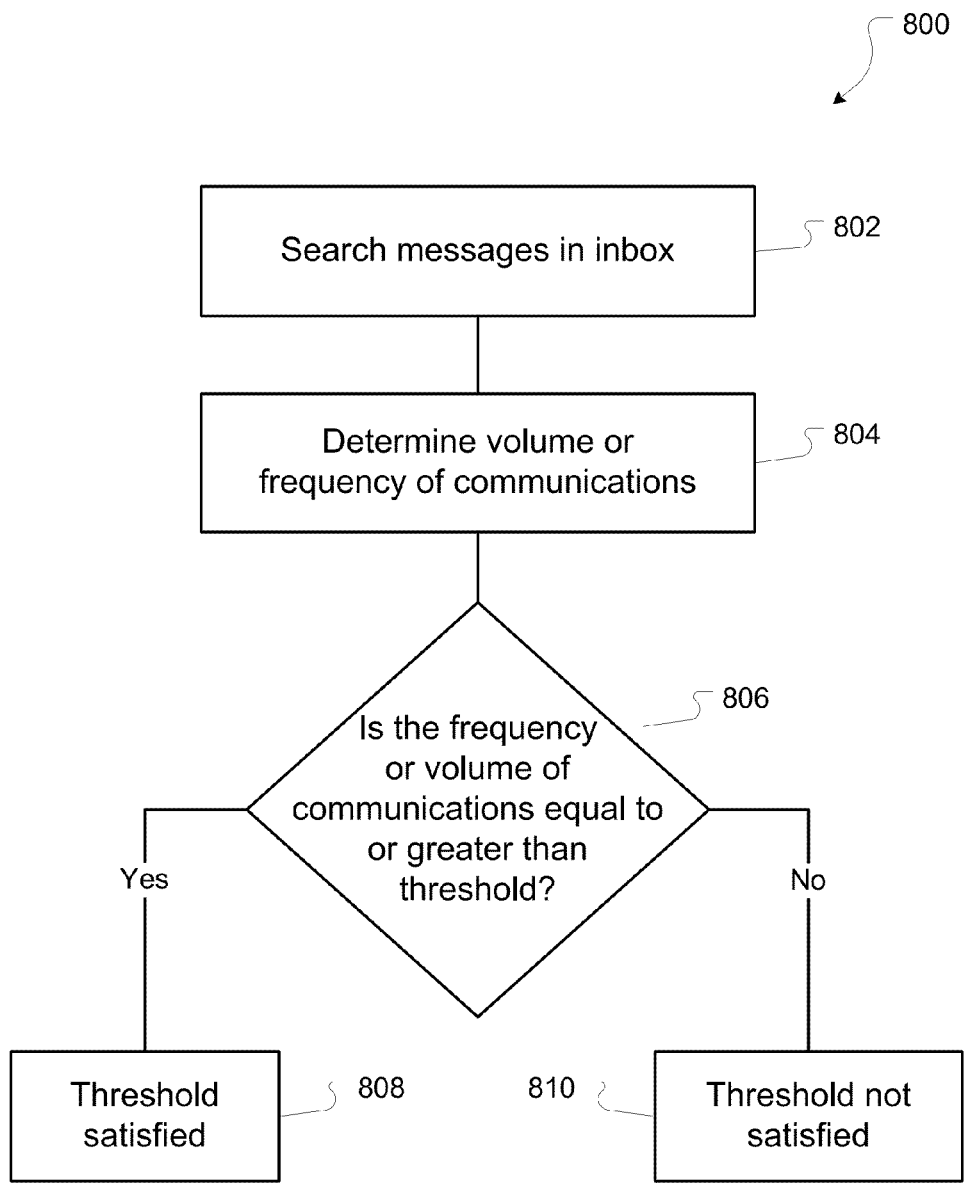
FIG. 8 shows a first method to determine whether missing information is necessary according to one embodiment.

FIG. 8 illustrates an exemplary method (800) for step (704) in FIG. 7 involving a threshold value that relates to communication frequency or communication volume. As shown in FIG. 8, the method (800) begins step (802), where messages in the inbox of the user are searched and analyzed. The method (800) proceeds to step (804), where the communication frequency with respect to a particular contact is determined for a threshold value concerning communication frequency. Alternatively, the communication volume with respect to a particular contact is determined for a threshold value concerning communication volume. The method (800) proceeds to decision step (806), where it is determined whether the communication frequency or, alternatively the communication value, is equal to or greater than a threshold value. If the result of decision step (806) is yes, the method (800) proceeds to step (808) where it is determined that the threshold is satisfied and the missing information is thus deemed necessary. The method (800) then proceeds to steps (706, 708). If the result of decision step (806) is no, the method (800) proceeds to step (808) where it is determined that the threshold is not satisfied and the missing information is deemed not necessary.

Figure 9:
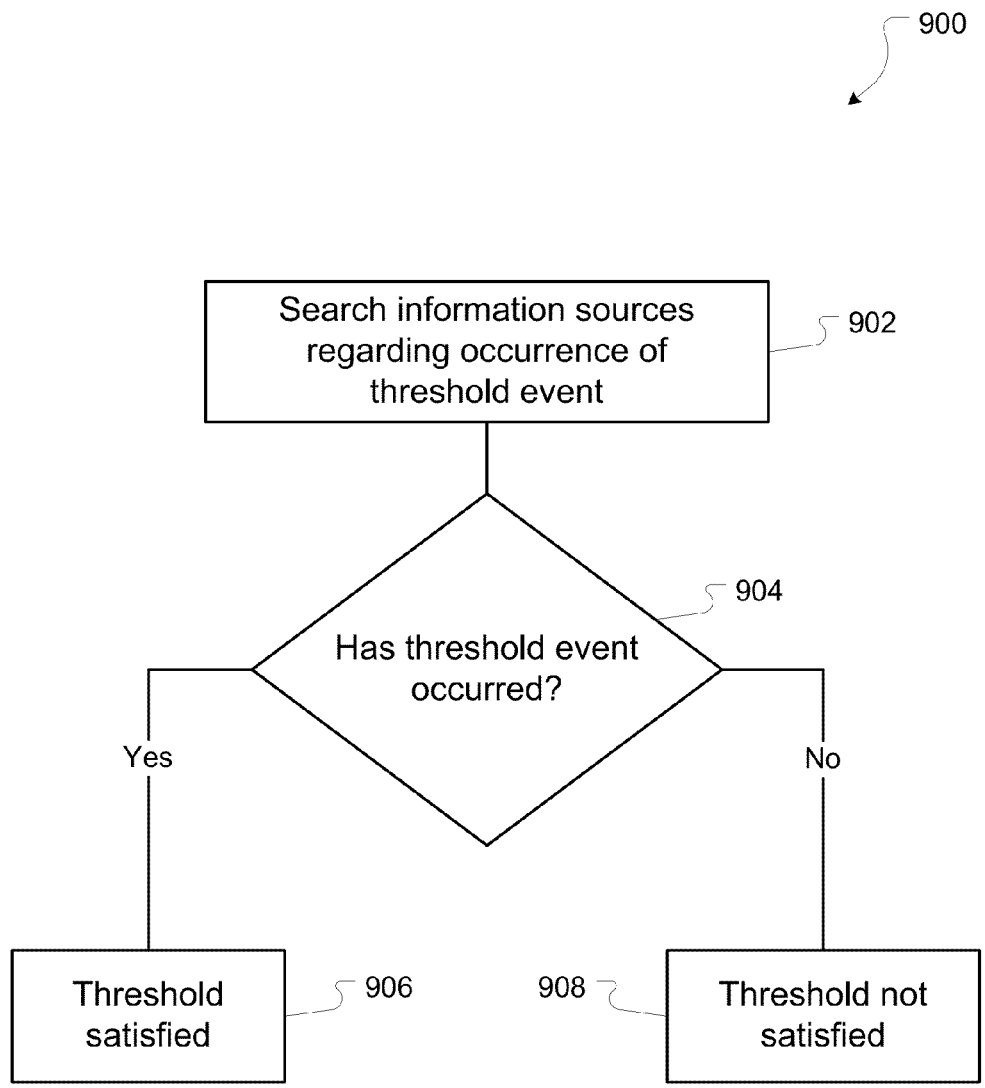
FIG. 9 shows a second method to determine whether missing information is necessary according to one embodiment.

FIG. 9 illustrates an exemplary method (900) for step (704) in FIG. 7 involving a threshold event that can relate to the context and content of communications with a contact. As shown in FIG. 9, the method (900) begins step (902), where information sources, such as the inbox and the calendar of the user, are searched to determine the occurrence of a threshold event. The method (900) proceeds to decision step (904), where it is determined whether the threshold event has occurred. If the result of decision step (904) is yes, the method (900) proceeds to step (906) where it is determined that the threshold is satisfied and the missing information is thus deemed necessary. The method (900) then proceeds to steps (706, 708). If the result of decision step (904) is no, the method (900) proceeds to step (908) where it is determined that the threshold is not satisfied and the missing information is deemed not necessary.

In one embodiment, the methods described in connection with FIGS. 7-9 can be modified in accordance with the functionality performed by the profile builder (119) as described in connection with FIGS. 4-6.

Figure 10:
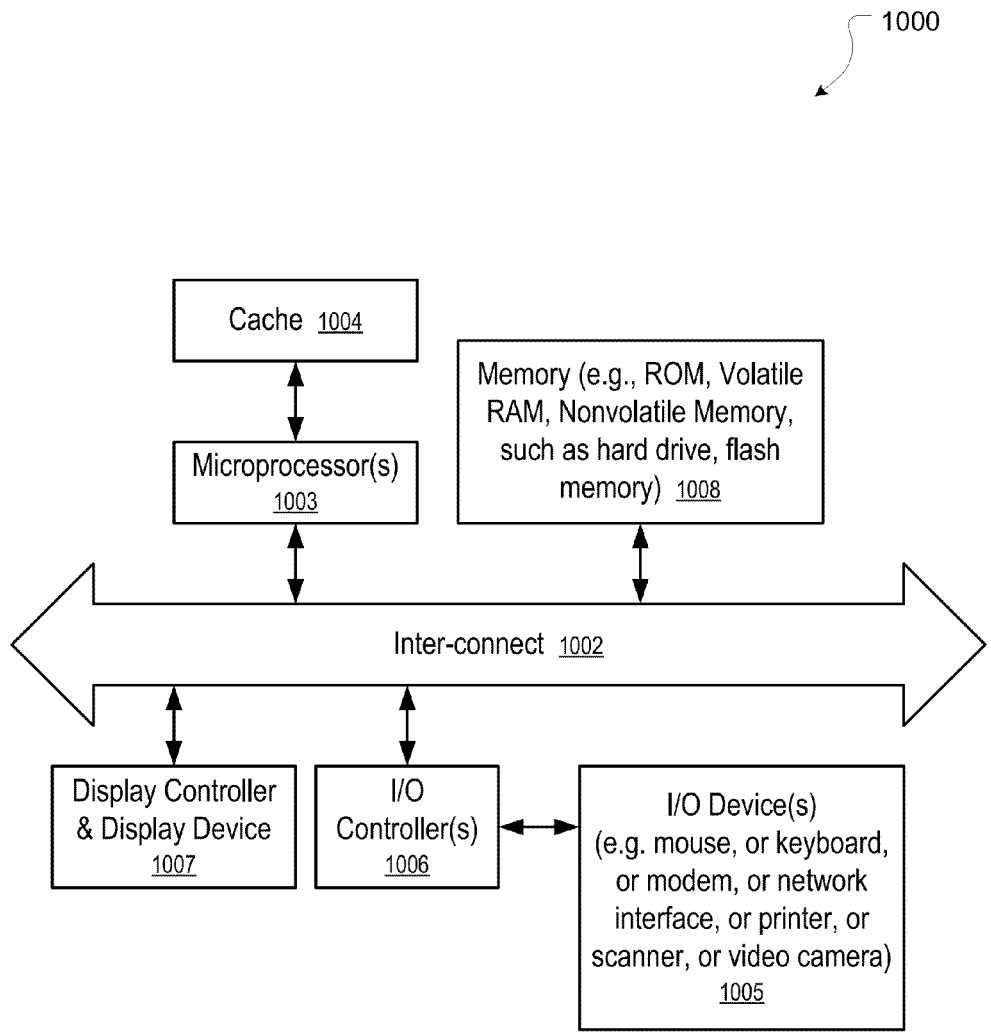
FIG. 10 shows a data processing system, which can be used in various embodiments.

FIG. 10 shows a data processing system, which can be used in various embodiments. While FIG. 10 illustrates various components of a computer system, it is not intended to represent any particular architecture or manner of interconnecting the components. Some embodiments may use other systems that have fewer or more components than those shown in FIG. 10.

In one embodiment, the user terminal (101) can be implemented as a data processing system, with fewer or more components, as illustrated in FIG. 10. When one or more components of the user terminal (101) are implemented on one or more remote servers, the servers can be implemented as a data processing system (1001), with fewer or more components, as illustrated in FIG. 10.

In FIG. 10, the data processing system (1001) includes an inter-connect (1002) (e.g., bus and system core logic), which interconnects a microprocessor(s) (1003) and memory (1008). The microprocessor (1003) is coupled to cache memory (1004) in the example of FIG. 10.

The inter-connect (1002) interconnects the microprocessor(s) (1003) and the memory (1008) together and also interconnects them to a display controller, display device (1007), and to peripheral devices such as input/output (I/O) devices (1005) through an input/output controller(s) (1006).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (1002) may include one or more buses connected to one another through various bridges, controllers and/or adapters. In one embodiment, the I/O controller (1006) includes a USB (Universal Serial Bus) adapter for controlling USB peripherals, and/or an IEEE-1394 bus adapter for controlling IEEE-1394 peripherals.

The memory (1008) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method, comprising:
    identifying, via a computing device, missing information from a profile of a contact;
    determining whether the missing information is necessary for the profile based on satisfaction of a threshold, wherein the threshold is set by a user and is selected from a group consisting of occurrence of an event, communication content, communication frequency, and communication volume, and wherein the threshold reflects a time during which the computing device is instructed to automatically seek missing necessary information from sources other than the contact;
    automatically seeking the missing necessary information during the time and
    prompting the user to request the missing necessary information from the contact;
    obtaining the missing information; and
    adding the missing information to the profile.

2. The method of claim 1, wherein the threshold is a value indicative of communication frequency between the user and the contact.

3. The method of claim 1, wherein the threshold is a value indicative of communication volume between the user and the contact.

4. The method of claim 1, wherein the threshold is an event.

5. The method of claim 1, wherein the threshold is set by the user.

6. The method of claim 1, wherein the threshold depends on the relationship type between the user and the contact.

7. The method of claim 1, further comprising prioritizing the missing information, the missing information corresponding to a plurality of information fields of the profile.

8. The method of claim 1, further comprising searching other information sources for the missing information prior to the prompting, the other information sources including at least one of the following: social networks, partner networks, and non-partner networks.

9. The method of claim 1, wherein the prompting includes generating a message to request the missing information, the message editable by the user and configured to be included in a communication from the user to the contact.

10. The method of claim 9, wherein the prompting further includes providing the user a selectable option to assent to inclusion of the message in the communication.

11. The method of claim 10, wherein the communication is at least one of the following: email, text message, and instant message.

12. The method of claim 1, wherein:
    the determining includes analyzing received messages of a first communication medium type to determine whether the threshold has been satisfied; and
    the prompting includes generating a message to request the missing information, the message to be included in a communication from the user to the contact, the communication of a second communication medium type different from the first communication medium type.

13. The method of claim 12, wherein the first communication medium type is email and the second communication medium type is text message.

14. The method of claim 12, wherein the first communication medium type is phone calls and the second communication medium type is email.

15. The method of claim 1, wherein the missing information includes dated information, the method further comprising replacing the missing information in the profile with updated information.

16. The method of claim 1, further comprising, prior to the identifying, employing voice recognition during a phone call between the user and the contact to detect the contact and obtain the profile of the contact.

17. A user terminal, comprising:
    a storage device to store a set of messages for a user; and
    a profile presenter to identify missing information from a profile of a contact, determine whether the missing information is necessary for the profile based on satisfaction of a threshold, wherein the threshold is set by a user and is selected from a group consisting of occurrence of an event, communication content, communication frequency, and communication volume, and wherein the threshold reflects a time during which the profile presenter is instructed to automatically seek missing necessary information, automatically seek the missing necessary information during the time from sources other than the contact, prompt the user to request the missing information from the contact, obtain the missing information, and add the missing information to the profile.

18. The user terminal of claim 17, wherein the profile presenter is implemented via at least one processor and a memory storing a set of instructions for the processor.

19. The user terminal of claim 17, wherein at least a portion of the profile presenter is implemented via an application specific integrated circuit (ASIC) or Field-Programmable Gate Array (FPGA).

20. A tangible, non-transitory machine readable storage media storing a set of instructions that, when executed by a computing device, cause the computing device to perform a method, the method comprising:

identifying missing information from a profile of a contact;

determining whether the missing information is necessary for the profile based on satisfaction of a threshold, wherein the threshold is set by a user and is selected from a group consisting of occurrence of an event, communication content, communication frequency, and communication volume, and wherein the threshold reflects a time during which the computing device is instructed to automatically seek missing necessary information from sources other than the contact;

automatically seeking the missing necessary information during the time;

prompting the user to request the missing necessary information from the contact;

obtaining the missing information; and adding the missing information to the profile.

* * * * *